Patented Sept. 17, 1940

2,215,249

UNITED STATES PATENT OFFICE 2,215,249

ETHYL CELLULOSE MOLDING COMPOSITION

William W. Pedersen, Midland, Mich., assignor to The Dow Chemical Company, Midland, Mich., a corporation of Michigan No Drawing. Application February 6, 1939, Serial No. 254,886

3 Claims. (Cl. 106—40)

This invention concerns new thermoplastic molding compositions comprising ethyl cellulose.

In the compression or injection molding of ethyl cellulose and other cellulose derivative plastic compositions, considerable difficulty is encountered because of the tendency of such compositions to adhere to the molding die. Ejection of the molded article from the die not only requires considerable force, but in some cases may damage the article to such an extent that it must be remolded. Furthermore, the surface of the molding lacks the gloss or lustre desired in molded plastic articles and is easily scratched or marred.

Because of these difficulties it has become common practice to incorporate into molding compositions a lubricating agent which will facilitate ejection of the molding from the die. Among the substances which have been employed for this purpose are stearic acid, beeswax, carnauba wax, paraffin, aluminum palmitate, etc. Many of such materials, however, are not satisfactory for use as mold lubricants in ethyl cellulose molding compositions since they are compatible with ethyl cellulose at molding temperatures and do not remain on the surface of the composition in sufficient quantity to effect the desired degree of lubrication. Others of these materials have a tendency to crystallize out of the composition upon aging, thereby causing blushing or blooming of the molded article. Others impart a sticky or greasy feel to the surface of the article or render it so soft as to be readily scratched or marred. Still others seem to react chemically with the ethyl cellulose causing surface embrittlement.

I have now found that the waxy constituent of esparto grass, known to the trade as esparto grass wax, is particularly well-adapted to be employed as a lubricating agent in ethyl cellulose molding compositions. Esparto grass wax is a hard, brown wax which is obtained as a by-product in the manufacture of esparto grass paper. It has a melting point of approximately 70°-80° C., a saponification value of about 50-80, and an acid number of about 20-35. It is sufficiently incompatible with ethyl cellulose that it forms a thin lubricating layer on the surface of the molding immediately upon cooling, thereby permitting easy ejection of the molded article from the die. The presence of the wax in the molding composition also imparts to the molded article a hard, smooth, lustrous surface which is not easily scratched and which does not blush or bloom upon aging.

The new molding compositions comprising ethyl cellulose and esparto grass wax are conveniently prepared by heat-colloiding the ethyl cellulose and wax on compounding rolls or in a Banbury-type mixer, with or without the aid of solvents, until a homogeneous mixture is obtained. In accordance with usual practice, plasticizing agents, such as dibutyl phthalate, tricresyl phosphate, triacetin, di-(ortho-xenyl) mono-phenyl phosphate, etc., as well as various fillers, dyes, pigments, etc. are also usually incorporated into the composition. The esparto grass wax is preferably employed in an amount representing approximately 1-10 per cent by weight of the ethyl cellulose although somewhat larger proportions may be employed if desired.

The following examples will illustrate several ways in which the principle of the invention has been applied but are not to be construed as limiting the same.

Example 1

A plasticized ethyl cellulose composition was prepared by mixing 100 grams of ethyl cellulose, 15 grams of di-(ortho-xenyl) mono-phenyl phosphate, and 150 grams of a mixed solvent consisting of 2 parts of benzol and 1 part methanol. The composition was broken into small pieces and was dried at 50° C. It was then placed on heated compounding rolls and mixed until it became completely softened and slightly pasty. 4 grams of refined esparto grass wax was then added gradually to the softened plastic and compounding was continued on the rolls until the wax was completely dispersed. The composition was then removed from the rolls, cooled, and ground to form a molding powder. Articles molded from this composition were easily ejected from the molding die and had a hard smooth glossy surface of good scratch resistance.

Example 2

100 parts of ethyl cellulose, 15 parts of di-(ortho-xenyl) mono-phenyl phosphate, and 150 parts of a benzol-methanol mixture (2:1) were mixed in a Banbury mixer to form a pasty mass. 40 parts of a 10 per cent by weight solution of esparto grass in carbon tetrachloride were then added and mixing was continued until a homogeneous composition was obtained. The composition was dried at 50° C. and was placed on a heated two-roll colloiding mill and mixed until it had softened and was completely dispersed. The composition was then removed from the rolls, cooled, and ground to form a molding powder.

Example 3

A molding powder having the following composition:

| | Parts by weight |
|---|---|
| Ethyl cellulose | 100 |
| Di-(ortho-xenyl) mono-phenyl phosphate | 15 |
| Tri-(para-tertiarybutylphenyl) phosphate | 5 |
| Esparto grass wax | 6 | was prepared in a manner similar to that employed in Example 1. Articles molded from this composition were very easily ejected from the molding die and had excellent scratch resistance.

Other modes of applying the principle of my invention may be employd instead of those explained, change being made as regards the ingredients employed, provided the product stated by any of the following claims or the equivalent of such stated product be obtained.

I therefore particularly point out and distinctly claim as my invention:

1. A thermoplastic molding composition comprising ethyl cellulose and, as mold lubricant therefor, a small proportion of esparto grass wax.

2. A thermoplastic molding composition comprising ethyl cellulose and, as a mold lubricant therefor, from about 1 to about 10 per cent by weight of the ethyl cellulose of esparto grass wax.

3. A thermoplastic molding composition comprising ethyl cellulose, a plasticizing agent, and a small proportion of a mold lubricant consisting of esparto grass wax.

WILLIAM W. PEDERSEN.